US010555189B2

(12) United States Patent
Rahman

(10) Patent No.: US 10,555,189 B2
(45) Date of Patent: *Feb. 4, 2020

(54) PERFORMANCE DIAGNOSIS OF WIRELESS EQUIPMENT AND A WIRELESS NETWORK OVER OUT-OF BAND COMMUNICATION

(71) Applicant: AT&T Intellectual Property I, L.P., Atlanta, GA (US)

(72) Inventor: Moshiur Rahman, Marlboro, NJ (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/398,326

(22) Filed: Jan. 4, 2017

(65) Prior Publication Data

US 2017/0118662 A1    Apr. 27, 2017

Related U.S. Application Data

(63) Continuation of application No. 14/661,926, filed on Mar. 18, 2015, now Pat. No. 9,572,049, which is a
(Continued)

(51) Int. Cl.
*H04W 24/02* (2009.01)
*H04W 24/08* (2009.01)
(Continued)

(52) U.S. Cl.
CPC .......... *H04W 24/02* (2013.01); *H04L 5/005* (2013.01); *H04L 43/045* (2013.01);
(Continued)

(58) Field of Classification Search
CPC ..... H04W 24/00; H04W 24/08; H04W 24/02; H04W 24/04; H04W 4/14; H04W 48/18; H04W 88/06
See application file for complete search history.

(56) References Cited

U.S. PATENT DOCUMENTS 7,369,846 B2    5/2008  Koivukangas et al.
2006/0217116 A1*  9/2006  Cassett ............... H04L 41/5009
                                                      455/423

(Continued)

OTHER PUBLICATIONS

Office Action dated Nov. 5, 2012 for U.S. Appl. No. 12/912,412, 19 pages.
(Continued)

*Primary Examiner* — Nam T Huynh
(74) *Attorney, Agent, or Firm* — Amin, Turocy & Watson, LLP

(57) ABSTRACT

Performance issues of wireless equipment (WE) or a wireless network are diagnosed through an alternative communication channel enabled by an alternative wireless network available to the WE. A service platform (SP) probes performance condition of the WE through a mobility control node (MCN) and, in response to a fault condition, collects data related to operation of the WE. Based at least on part of the data, the SP diagnoses the fault condition and related performance issue(s). To probe performance, the SP requests the MCN to collect data related to performance metric(s) of the WE. The alternative communication channel is established, and such data is collected therefrom, in response to low-grade connectivity amongst the MCN and the WE. The SP notifies the WE of at least the fault condition through the MCN or, in case of network fault condition, via the alternative communication channel.

20 Claims, 7 Drawing Sheets

Related U.S. Application Data continuation of application No. 14/264,703, filed on Apr. 29, 2014, now Pat. No. 9,014,691, which is a continuation of application No. 12/912,412, filed on Oct. 26, 2010, now Pat. No. 8,750,862.

(51) Int. Cl.
  *H04W 24/00* (2009.01)
  *H04L 12/26* (2006.01)
  *H04L 5/00* (2006.01)
  *H04W 76/27* (2018.01)
  *H04W 88/12* (2009.01)

(52) U.S. Cl.
  CPC ........... *H04W 24/00* (2013.01); *H04W 24/08* (2013.01); *H04W 76/27* (2018.02); *H04W 88/12* (2013.01)

(56) References Cited

U.S. PATENT DOCUMENTS

| | | |
|---|---|---|
| 2007/0004398 A1 | 1/2007 | Juan |
| 2008/0248795 A1 | 10/2008 | Peterson et al. |
| 2011/0116469 A1 | 5/2011 | Bi et al. |
| 2012/0033583 A1* | 2/2012 | Hu ........................ H04W 48/18 370/254 |

OTHER PUBLICATIONS

Office Action dated Apr. 23, 2013 for U.S. Appl. No. 12/912,412, 13 pages.
Office Action dated Aug. 29, 2014 for U.S. Appl. No. 14/264,703, 14 pages.
Office Action dated Feb. 23, 2016 for U.S. Appl. No. 14/661,926, 14 pages.

* cited by examiner

PERFORMANCE DIAGNOSIS OF WIRELESS EQUIPMENT AND A WIRELESS NETWORK OVER OUT-OF BAND COMMUNICATION

CROSS-REFERENCE TO RELATED APPLICATIONS

This application is a continuation of, and claims the benefit of priority to each of, U.S. patent application Ser. No. 14/661,926, filed Mar. 18, 2015, and titled "PERFORMANCE DIAGNOSIS OF WIRELESS EQUIPMENT AND A WIRELESS NETWORK OVER OUT-OF-BAND COMMUNICATION," which is a continuation of U.S. patent application Ser. No. 14/264,703 (now U.S. Pat. No. 9,014,691), filed Apr. 29, 2014, and titled "PERFORMANCE DIAGNOSIS OF WIRELESS EQUIPMENT AND A WIRELESS NETWORK OVER OUT-OF-BAND COMMUNICATION," which is a continuation of U.S. patent application Ser. No. 12/912,412 (now U.S. Pat. No. 8,750,862), titled "PERFORMANCE DIAGNOSIS OF WIRELESS EQUIPMENT AND A WIRELESS NETWORK OVER OUT-OF-BAND COMMUNICATION" and filed Oct. 26, 2010. The entireties of the aforementioned applications are hereby incorporated by reference herein.

TECHNICAL FIELD

The subject disclosure relates generally to wireless communications and, more particularly, to diagnosing performance issues of wireless equipment and a wireless network through communication over a channel enabled by a disparate wireless network; the channel exploits spectral resources outside the band of spectral resources utilized by the wireless network.

BACKGROUND

Quality of wireless services provided by a telecommunication carrier and perceived quality of such services as experienced by a subscriber is driven primarily by performance of the wireless network deployed and administered by the telecommunication carrier. A myriad of equipment and related software and firmware applications can affect performance of a wireless network. Accordingly, telecommunication carriers typically monitor operation of such equipment and assess performance through multiple key performance indicators (KPIs). For user equipment (UE), performance generally is monitored by collecting data from UE when a connection is established amongst the UE and at least one network component of the wireless network. The data and the at least one network component typically are specific to the radio technology (Global System for Mobile Communications (GSM), Universal Mobile Telecommunication System (UMTS), Long Term Evolution (LTE), Wi-Fi, WiMax, satellite-based telecommunication, etc.) employed by the wireless network to provide wireless service. In addition, the data generally is collected at various operational stages of the UE, such as Radio Resource Control (RRC) connection setup in a Third Generation Partnership Project (3GPP) UMTS network. Accordingly, in conventional wireless networks, the integrity or accuracy of the data collected to evaluate network performance is dictated by the network performance itself. Moreover, in conventional wireless networks, the availability of such data generally is hindered in underperforming operating conditions of the wireless equipment or the network components associated with performance assessment. Compromised integrity, accuracy, and availability of data related to network performance can lead to unsatisfactory network performance, unwarranted utilization of network resources to address subscriber concerns with received wireless service, and lost opportunities to diagnose and rectify performance issues.

DETAILED DESCRIPTION

Figure 1:
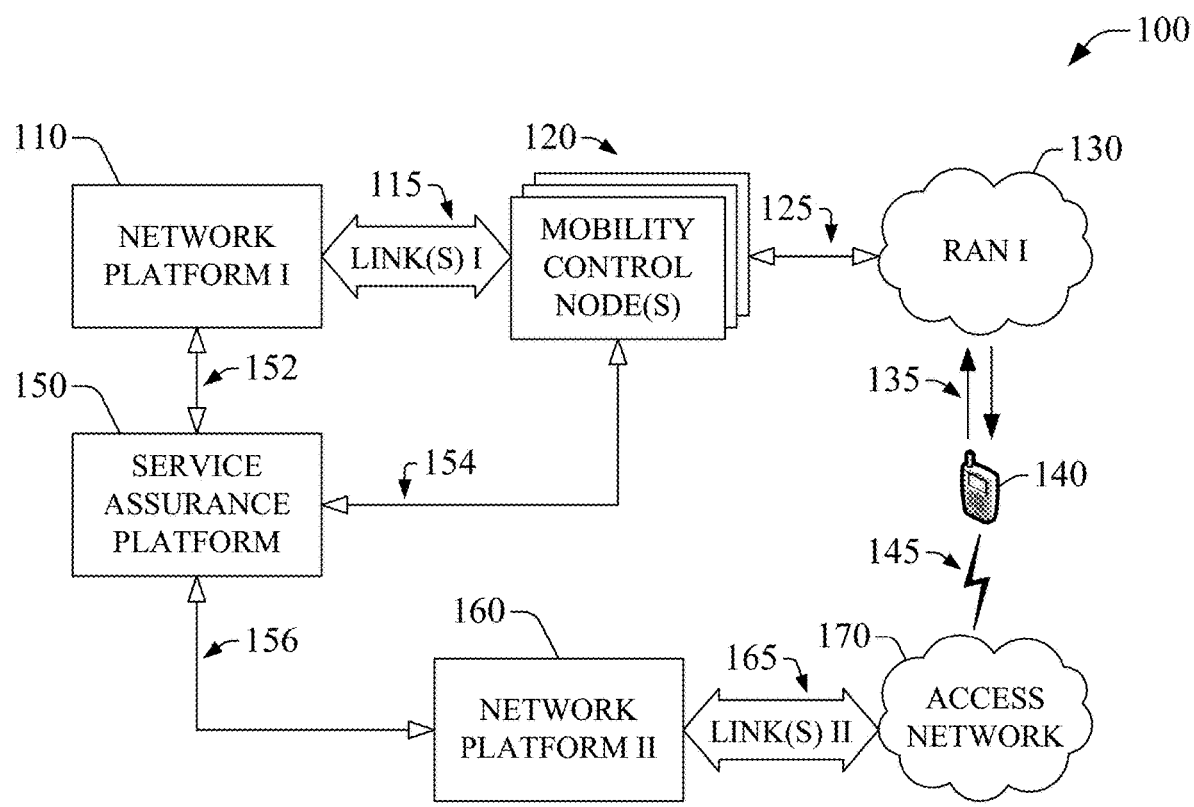
FIG. 1 illustrates an example system for wireless communication that enables and exploits performance diagnosis of wireless equipment through communication over an out-of-band channel in accordance with aspects described herein.

The subject disclosure is now described with reference to the drawings, wherein like reference numerals are used to refer to like elements throughout. In the following description, for purposes of explanation, numerous specific details are set forth in order to provide a thorough understanding of the various embodiments of the subject disclosure. It may be evident, however, that the subject disclosure may be practiced without these specific details. In other instances, well-known structures and devices are shown in block diagram form in order to facilitate describing the various embodiments of the subject disclosure.

As used in this application, the terms "component," "system," "platform," "layer," "node," "interface," and the like are intended to refer to a computer-related entity or an entity related to an operational apparatus with one or more specific functionalities, wherein the computer-related entity and the entity related to the operational apparatus can be either hardware, a combination of hardware and software, software, or software in execution. One or more of such computer-related entities or entities related to the operational apparatus also are referred to herein as "functional elements." As an example, a component may be, but is not limited to being, a process running on a processor, a processor, an object, an executable, a thread of execution, a program, and/or a computer. By way of illustration, both an application running on a server or network controller, and the server or network controller can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, layer, node, interface, and the like.

Various aspects of the subject disclosure are presented in terms of systems or embodiments that may include a number of components, modules, nodes, interfaces, platforms, or the like. It is to be understood and appreciated that the various systems or embodiments may include additional components, modules, etc., and/or may not include all of the components, modules, nodes, interfaces, platforms, etc. discussed in connection with the annexed drawings. A combination of these approaches may also be used.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Further yet, the term "set" as employed herein excludes the empty set. Thus, a "set" in the subject disclosure includes one or more elements or entities. As an illustration, a set of devices includes one or more devices, a set of recipients includes one or more recipients, a set of addresses can include K addresses with K a natural number greater than or equal to unity. In addition, as employed herein, the term "sub-set" can include the empty set. In the subject disclosure, it explicitly noted when a sub-set excludes the empty set.

Features or aspects described in the subject disclosure can rely, at least in part, on delivery or reception of directive(s), indication(s), request(s), or the like, and information or payload data (e.g., content(s)) associated therewith. Directive(s) can be embodied in multi-bit words (e.g., P-bit words, with P a positive integer) and coded to specifically convey a request to a particular functional element (e.g., a femtocell AP) in order to execute one or more specific operation. Information or payload data within signaling, and request(s) or indication(s) conveyed therein, can be embodied, for example, in one or more reserved bits in a packet header, a light-payload (e.g., of the order of 1 byte) data packet, a predetermined multi-bit word conveyed in a control channel, a lightweight file (e.g., a cookie), an email communication, an instant message, or the like. In addition, directive(s), request(s), indication(s), or the like, as described herein, can be delivered in accordance with various communication protocols. As an example, the various protocols can include at least one of file transfer protocol (FTP), secure shell FTP (SFTP), FTP over secure socket layer (FTPS), short message service (SMS) protocol, multimedia messaging service (MMS) protocol, unstructured supplementary service data (USSD) standard, simple network management protocol (SNMP), lightweight directory access protocol (LDAP), session initiation protocol (SIP), SIP for Instant Messaging and Presence Leveraging Extensions (SIMPLE), Open Mobile Alliance (OMA) device management (DM) protocol, Technical Report 069 (TR-069) protocol, also referred to as Customer Premise Equipment (CPE) Wide Area Network (WAN) Management Protocol or CWMP, or the like.

One or more embodiments of the subject disclosure provide system(s), apparatus (es) and method(s), and related computer-readable media, to diagnose performance issues of wireless equipment and a first wireless network through communication over a channel enabled by a second wireless network. With respect to channel(s) enabled by the first wireless network, the channel is an out-of-band channel in that it exploits resources (e.g., electromagnetic (EM) frequency bands) outside the domain of resources (e.g., EM frequency bands) utilized the channel(s) afforded by the first wireless network. A service platform (SP) probes performance condition of the WE through a mobility control node (MCN); the service platform can be part of a service network external to the first wireless network. In response to a fault condition, the SP collects data related to operation condition of the WE. Based on at least a portion of the collected data, the SP generates a diagnostic of the fault condition and related performance issue; for instance, the SP records detection of the fault condition and categorizes the fault condition as a network-based fault or a WE-base fault. To probe the performance, the SP requests the MCN to collect data related to performance metric(s) of the WE. In response to low-grade connectivity amongst the MCN and the WE, the channel enabled by the alternative wireless network is established and the data is collected, in part, through such channel. The SP notifies the WE of at least the fault condition through the MCN or, in case of network-based fault, the channel enabled by the alternative network.

The one or more embodiments of the subject disclosure provide various advantages over conventional wireless networks. An example advantage is that utilization of an out-of-band communication channel renders network performance diagnosis resilient or substantially resilient with respect to performance issues. Another example advantage is low-complexity: In certain embodiments, performance condition of wireless equipment can be assessed through collection of CRC error counts, which in 3GPP UMTS networks is performed as part of RRC connection setup. Accordingly, by leveraging network deployments alternative to 3GPP UMTS networks, a network operator can exploit data related to CRC error counts to readily implement network performance diagnosis without extensive modification to network architecture.

In the subject disclosure, performance diagnosis of wireless equipment or a wireless network is enabled by a communication channel implemented, at least in part, through an alternative wireless network. Performance diagnosis comprises detection and identification of performance issues, or performance faults, related to operation of either the wireless equipment or the wireless network. With respect to channel(s) afforded by the wireless network, the communication channel is an out-of-band channel since it exploits spectral resources outside the band of spectral resources utilized the channel(s) afforded by the wireless network. Utilization of the out-of-band communication channel renders the performance diagnosis resilient or substantially resilient with respect to performance issues.

Referring to the drawings, FIG. 1 is a block diagram of an example system 100 for wireless communication that enables and exploits performance diagnosis of wireless equipment (WE) through communication via out-of-band channel(s) in accordance with aspects described herein. Performance diagnosis comprises detection of a performance issue and isolation or identification thereof; performance issues can be categorized broadly as network-based faults and WE-based faults. Wireless equipment refers to one or more devices (wireless or tethered) that include functional element(s) (hardware, software, firmware, etc.) for wireless communication and can be configured to communicate wirelessly—wireless communication includes utilization of wireless network resources (electromagnetic spectrum carriers or bandwidth, telecommunication channels, etc.) to telecommunicate voice or data. Wireless equipment (WE) can include user equipment (UE), customer premises equipment (CPE), or the like. Example system 100 includes at least two networks that provide wireless service and operate in accordance with respective radio technologies (e.g., terrestrial radio access, deep-space radio access). A first network includes network platform I 110 and one or more link(s) I 115 that functionally couple (e.g., communicatively couple) network platform I 110, and component(s) therein, to a set of mobility control node(s) 120. Link(s) 115 are logically specific to radio technology of the first network; for instance, for Long Term Evolution (LTE), link(s) 115 include S1 interface, S2 interface, X2 backhaul link, whereas for UMTS, link(s) 115 include Iups interface. It is noted that when referring to an example system, apparatus, or device in the subject disclosure, outlined arrows and associated connecting segments represent link(s) or interface(s) that functionally couple components, APs, servers, nodes, or the like, that in the illustrated example embodiment(s) generally are not integrated into a single functional element. However, in alternative embodiments, some of such components, servers, nodes, or the like, may be integrated into a single functional element. In contrast, solid black arrows and associated connecting segments represent functionally coupled functional elements (components, servers, APs, nodes, or the like) that, in the illustrated example embodiments, can be integrated, at least in part, into a single functional element even though such functional elements are represented as separate entities. One or more link(s) 125 functionally couple at least one mobility control node in the set of mobility control node(s) 120 to radio access network (RAN) I 130 via platform I 110 is thus functionally coupled to RAN I 130. Link(s) 125 also are logically specific to radio technology of the first network; for example, for UMTS, link(s) 125 include Iub. The RAN I 130 comprises one or more outdoor-based (or outdoor) base stations, associated electronic circuitry, and respective deployment site(s) of the one or more outdoor base stations (not shown in FIG. 1). In addition, the RAN I 130 includes the air-interface, which comprises a least one wireless radio link operated in accordance with the base station(s) radio technology (UTRAN, LTE, GERAN, UMB, WiMax, etc.). Moreover, the RAN I 130 comprises various coverage cells or sectors, with one or more base station(s) serving a single cell. A base station (not shown) in RAN I 130 provides, in part, wireless service to UE 140. Wireless links 135 functionally couple UE 140 to one or more base stations in RAN I 130. In example system 140, UE 140 embodies wireless equipment. While UE 140 is represented pictorially with a telephone, it should be appreciated that UE 140 is not limited to such particular mobile device. UE 140 can be any mobile device (e.g., cellphone, laptop computer with wireless connectivity card, netbook, digital video recorder (DVR) . . . ) that can communicate wirelessly. In certain embodiments, UE 140 can be a wearable device with enabled wireless capability that is attached to a subscriber's garment or gear (goggles, helmet, etc.) or is mounted on a subscriber's body part.

Based on deployment architecture, one or more base stations (not shown) in RAN I 130 are functionally coupled to a single mobility control node. For a base station (not shown) that serves UE 140, a mobility control node (MCN) in the set of MCN(s) 120, and one or more additional network components that are part of network platform I 110 enable transmission of data and signaling to UE 140. Mobility control node(s) described herein thus can exchange (e.g., transmit and receive) traffic and control signaling to UE 140. A mobility control node is logically specific to the radio technology utilized for telecommunication by a network that provides wireless service (e.g., a wireless network); in certain scenarios, the serving node also can be physically specific to such radio technology. In certain embodiments, at least one mobility control node can reside with a base station (not shown) that is part of RAN I 130. For instance, for 3GPP LTE radio technology, or a 3GPP LTE network, at least one mobility control node in the set of MCN(s) 120 (e.g., each MCN in such set) is embodied in a Mobility Management Entity. Alternatively or additionally, in embodiments related to 3GPP UMTS radio technology, or a 3GPP UMTS network, at least one mobility control node in the set of MCN(s) 120 (for example, each MCN in such set) is embodied in a Mobility Management Entity.

Additionally, example system 100 includes a second wireless network, which comprises a network platform II 160 functionally coupled (e.g., communicatively coupled) to an access network (AN) 170 via one or more link(s) II 165. UE 140 can communicate wirelessly via wireless link(s) 145 with at least one functional element (access point, distributed antenna system, node, server, etc.) of AN 170. It should be appreciated that wireless links 145 can be functionally different from wireless links 135; for instance, radio technology employed for transport of data and signaling via wireless link 145 can be different from that employed for transport of data and signaling through wireless links 135. Thus, the second wireless network can provide wireless service to UE 140 after the UE 140 has been registered and authorized to access wireless service via the second wireless network. In certain scenarios, the second wireless network provides private or semi-private wireless coverage. In an aspect, the second wireless network and related network platform II 160, link(s) 165, and AN 170 can offload communication of data and signaling from the first network platform described supra. Offloaded communication of data and signaling is effected through network resources (EM frequency carriers or channels, EM frequency bandwidth, backhaul backbone resources, etc.) distinct from those utilized by the first wireless network; accordingly, such communication is referred to as out-of-band communication, whereas communication through network resources of the first wireless network is referred to as in-band communication. Access network 170 includes functional elements that are logically and physically specific to the technology employed a the radio interface and at the backhaul backbone network that enable, at least in part, wireless communication through the second wireless network. For terrestrial radio communication, access network 170 includes a RAN comprising a set of access points (femtocell APs, Wi-Fi APs, eNode Bs, etc.) and related areas of coverage. In the alternative, for satellite-based telecommunication, access network 170 includes at least one satellite, associated deep-space wireless links; areas of coverage are dictated by LOS considerations.

While illustrated as separate entities, in embodiments in which the first wireless network administered by network platform I 110 and the second wireless network administered by network platform II 160 are for terrestrial telecommunication, RAN I 130 and at least a portion of AN 170 can overlap at least partially. In such scenario, one or more base stations associated with RAN I 130 being deployed in areas in which access point(s) (femtocell AP(s), Wi-Fi AP(s), eNode B(s), etc.) associated with AN 180 also are deployed.

Example system 100 also includes a service assurance platform 150 functionally coupled to network platform I 110 through link(s) 152, and to at least one MCN in the set of mobility control node(s) 120 via link(s) 154 and at least one functional element within service assurance (SA) platform 150. SA platform 150 also is functionally coupled to network platform II 160 via link(s) 156 and at least one functional element within SA platform 150. In an embodiment, e.g., example embodiment 200 illustrated in FIG. 2, the set of gateway node(s) 204 embodies functional element(s) that enables, in part, functional coupling of SA platform 150 to an MCN and to network platform II 160. As illustrated, SA platform 150 is external to network platform I 110 and network platform II 160; in an aspect, SA platform 150 can be part of a service network (not shown) that is common to the first wireless network and the second wireless network. Such scenario can be realized when a single service provider administers the first and second wireless networks. In alternative embodiments, SA assurance platform 150 can be internal to either network platform I 110 or network platform II 160. SA platform 150 can manage network performance remotely; the network performance includes performance of wireless equipment, performance of network functional elements, or the like. In an aspect, management of network performance includes monitoring thereof and diagnosis of performance issues. In another aspect, management of network performance includes generation of performance intelligence, such as recordation of performance data, aggregation of such data, recordation of interaction with customers, or the like. Additionally or alternatively, as part of management of network performance, SA platform 150 also can provide customer support. In certain embodiments, e.g., example embodiment 200, performance diagnosis component 212 enables SA platform 150 to manage network performance remotely and can implement various features thereof as described herein.

To manage network performance remotely, SA platform 150 can consume data indicative of performance condition(s) of UE 140 and can generate a performance diagnosis based on such data. In an aspect, SA platform 150 can consume such data actively, where SA platform 150 can collect the data indicative of performance condition(s) of the UE 140 from an MCN in the set of MCNs 120; SA platform 150 can collect such data on-demand or dynamically. As part of on-demand collection, SA platform 150 can deliver a request to collect data related to operation condition(s) of the UE 140 in response to a request from a network functional element (component(s), network node(s), server(s), etc.) related to providing wireless service to the UE 140 or to administering (e.g., provisioning, activating, troubleshooting, etc.) the UE 140. In the alternative, as part of dynamic collection, SA platform 150 can deliver a request to collect data related to operation condition(s) of UE 140 in response to occurrence of a predetermined event. For instance, dynamic collection can occur in accordance with a schedule; the predetermined event can be expiration of timer(s) configured to elapse a predetermined time interval within a cycle (a day, a week, a month, etc.), wherein the schedule dictates the timer(s) configuration. In an embodiment, e.g., example embodiment 200 illustrated in FIG. 2, SA platform 150 includes a connectivity component 208 that can generate and deliver a request to collect data indicative of performance condition(s) of the UE 140. Connectivity component 208 can request collected of such data from an MCN in the set of MCNs 120, as indicated supra, or from a disparate network component enabled to produce such data. In response to the request, connectivity component 208 can receive (e.g., collect and decode) the data indicative of performance condition(s) of UE 140. In example embodiment 200, performance diagnosis component 212 can analyze at least a portion of the data indicative of performance condition(s) of UE 140 that is received at SA platform 150, and generate a performance diagnosis based on results of the analysis.

In certain scenarios, data indicative of a performance condition includes error detection statistics (e.g., accumulation values, such as counts of error events, various momenta (average, standard deviation . . . ) of distribution of error events, or the like). In an aspect, error detection can be effected via Cyclic Redundancy Check (CRs) error counts. Data related to CRC counts for wireless equipment (e.g., UE 140) can be generated or supplied by at least one MCN in the set of mobility control node(s) 120, and SA platform 150 can acquire (retrieve, receive, request, etc.) such data from the at least one MCN (e.g., an RNC in a 3GPP UMTS network). SA platform 150 can analyze the data related to CRC counts for the WE and based on a result of the analysis can detect a performance issue. As part of the analysis, SA platform 150 can compare CRC error counts for UE 140 against a predetermined threshold. The predetermined threshold can be part of a set of performance (perf.) criteria retained within the SA platform 150; the set of performance criteria can include at least one threshold. In example embodiment 200, the set of performance criteria is embodied in memory element 228 (perf. criteria 228) within memory 224. If the comparison indicates that the CRC error counts for UE 140 exceed the predetermined threshold, then SA platform 150 can determine presence of (or detect) a performance fault. In response to detection of the performance fault, SA platform 150 can exchange a set of messages with the MCN (e.g., an RNC in a 3GPP UMTS network) that generated or supplied the data related to CRC error counts. Exchange of the set of messages enables the SA platform 150 to categorize the performance fault as a network-based fault or a WE-based fault. As an illustration, in example embodiment 200, connectivity component 208 can acquire the data related to CRC error counts for UE 140, and performance diagnosis component 212 can analyze such data as indicated supra. In addition, in example embodiment 200, connectivity component 208 can exchange the set of messages with the MCN via a gateway node in the set of gateway node(s) 204.

SA platform 150 can report performance fault(s). To at least that end, as illustrated in example embodiment 200, SA platform 150 can include a component, such as notification component 216, which can issue a message that conveys the performance fault(s) (e.g., WE-based fault or network-based fault) and can deliver the message. Delivery of the message can be effected via, in part, a gateway node of the set of gateway node(s) 204. For WE-based fault, SA platform 150 can notify the WE-based fault to the UE 140; in certain embodiments, the UE 140 can render a received notification. In an aspect, SA platform 150 can deliver a message that conveys the WE-based fault to the UE 140. The MCN that supplied the CRC counts can receive the message and relay it to the UE 140. In the alternative, for network-based fault, SA platform 150 can notify (e.g., deliver a message to) the network-based fault and related data to the UE 140. To at least such end, SA platform 150 can exploit the second wireless network comprising network platform II 160, link(s) 165, and AN 170. In an aspect, SA platform 150 can query a network repository in the second wireless network for registration state of the UE 140; for instance, in certain embodiments, the network repository can be Home Location Register (HLR), Visited Location Register (VLR), or Home Subscriber Server (HSS). In example embodiment 200, notification component 216 can query the network repository, represented by a repository 230 comprising a group of registration record(s) 234 for UE 140. In a scenario in which outcome of the query indicates UE 140 is registered with the second wireless network, SA platform 150 can initiate creation of a packet-based tunnel (e.g., a virtual private network tunnel, such as an IPSec tunnel) amongst the UE 140 and the SA platform 150. As an example, in a scenario in which the second wireless network is a 3GPP LTE network or a femtocell network, SA platform 150 can deliver a request to create a Packet Data Protocol (PDP) context amongst the UE 140 and the SA platform 150. For at least one wireless network in which UE 140 is registered, connectivity component 208 in example embodiment 200 can establish a packet-based tunnel amongst UE 140 and the SA platform 150.

As illustrated in example embodiment 200, SA platform 150 includes server(s) 220 configured to enable or that enable, at least in part, functionality of substantially any or any component, interface, node(s), or other functional element(s) within the SA platform 150. To provide at least such functionality, server(s) 220 can include at least one processor (not shown) that can execute computer-executable instructions (also referred to as computer-executable code instructions) retained in at least one memory (not shown) within the server(s) 220 or in a memory functionally coupled to server(s) 220, such as memory 224. In scenarios in which the computer-executable instructions are retained within memory 224, such instructions can be stored, for example, in application storage (not shown) within memory 224. In particular, though not exclusively, to provide at least a part of the functionality of the various functional elements of SA platform 150, the at least one processor within server(s) 220 can implement (e.g., execute) one or more of the example methods described in the subject specification. In alternative embodiments, a functional element within SA platform 150 (for example, performance diagnosis component 212, connectivity component 208, or notification component 216) can include one or more processors configured to enable or that enable functionality of the functional element in response to execution of a set of computer-executable instructions. The set of computer-executable instructions can be retained in memory 224 or any other memory included in the functional element or functionally coupled thereto.

Figure 2:
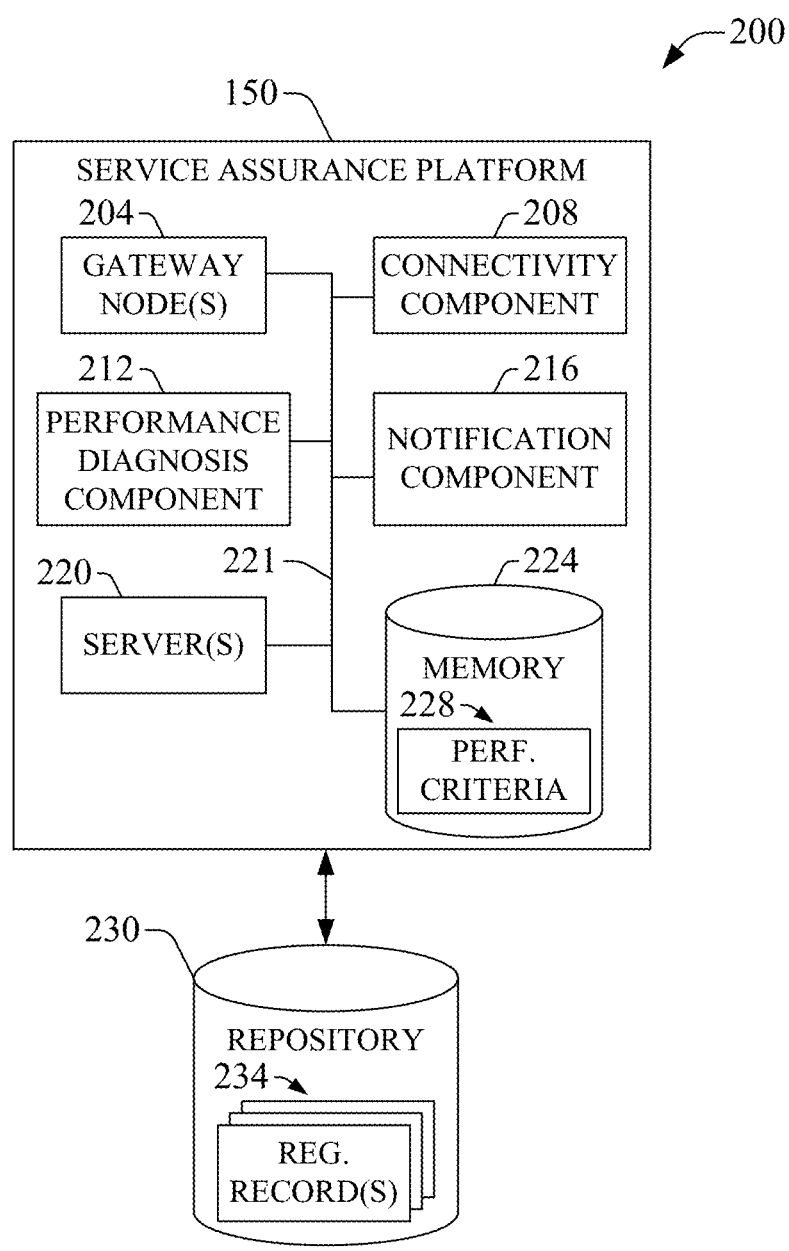
FIG. 2 presents an example embodiment of an example platform that enables, at least in part, performance diagnosis of wireless equipment through communication over an out-of-band channel in accordance with aspects described herein. The subject example platform is part of the example system illustrated in FIG. 1.

While not shown in FIG. 2, in addition to at least one processor and at least one memory functionally coupled thereto, server(s) 220 can include various functional elements that enable server(s) 220 to functionally connect to one or more networks, wireless or otherwise, and functional element(s) thereof. Such functional elements included within server(s) 220 comprise input/output (110) interface(s) or switches; a memory bus, an address bus, a system bus, a power bus, etc.; various connectors; and so forth.

In SA platform 150, functional elements, e.g., components, interfaces, node(s), can be mutually and functionally connected via bus 221. Such functional elements are also connected to memory 224 via bus 221. Server(s) 220 also can be functionally connected to components, interfaces, node(s), or substantially any or any functional elements that are part of SA platform 150. Bus 221 enables data or information exchange amongst the functional elements that it functionally connects. Such exchange of data or information allows, at least in part, numerous functional aspects SA platform 150 in accordance with aspects disclosed herein. In an aspect, bus 221 can be embodied in at least one of a memory bus, a system bus, an address bus, a message bus, or any other conduit, protocol, or mechanism for data or information exchange among components that execute a process or are part of execution of a process. In addition, bus 327 can include a power bus. Moreover, bus 221 can be embodied in reference link(s) or various interfaces that enable communication within a network platform.

Server(s) 220 can be functionally connected, through bus 221, to memory 224 in order to store and retrieve information such as computer-executable instructions, data structures, etc., necessary to operate or enable functionality of SA platform 150. In addition to illustrated memory elements, memory 224 also can store, for example, data structures, code instructions and program modules, or substantially any type of software applications or at least part of firmware application (e.g., device logic); telecommunication protocol(s); operating system or device information; and so on. Furthermore, memory 224 also can retain content(s) (e.g., end-user or application data, data generated by other devices, or the like); security credentials (e.g., passwords, encryption keys, digital certificates, biometric reference indicators like voice recordings, iris patterns, fingerprints); or the like.

In certain embodiments, one or more components of SA platform 150 (e.g., connectivity component 208, performance diagnosis component 212, or notification component 216) can be implemented as software application(s) or firmware application(s) and can reside within memory 224 (or any computer-readable storage medium functionally coupled to SA platform 150) as one or more sets of computer-executable instructions. In response to execution by at least one processor in server(s) 220, the one or more sets of computer-executable instructions implement the one or more components and related functionality thereof as described herein.

Figure 3:
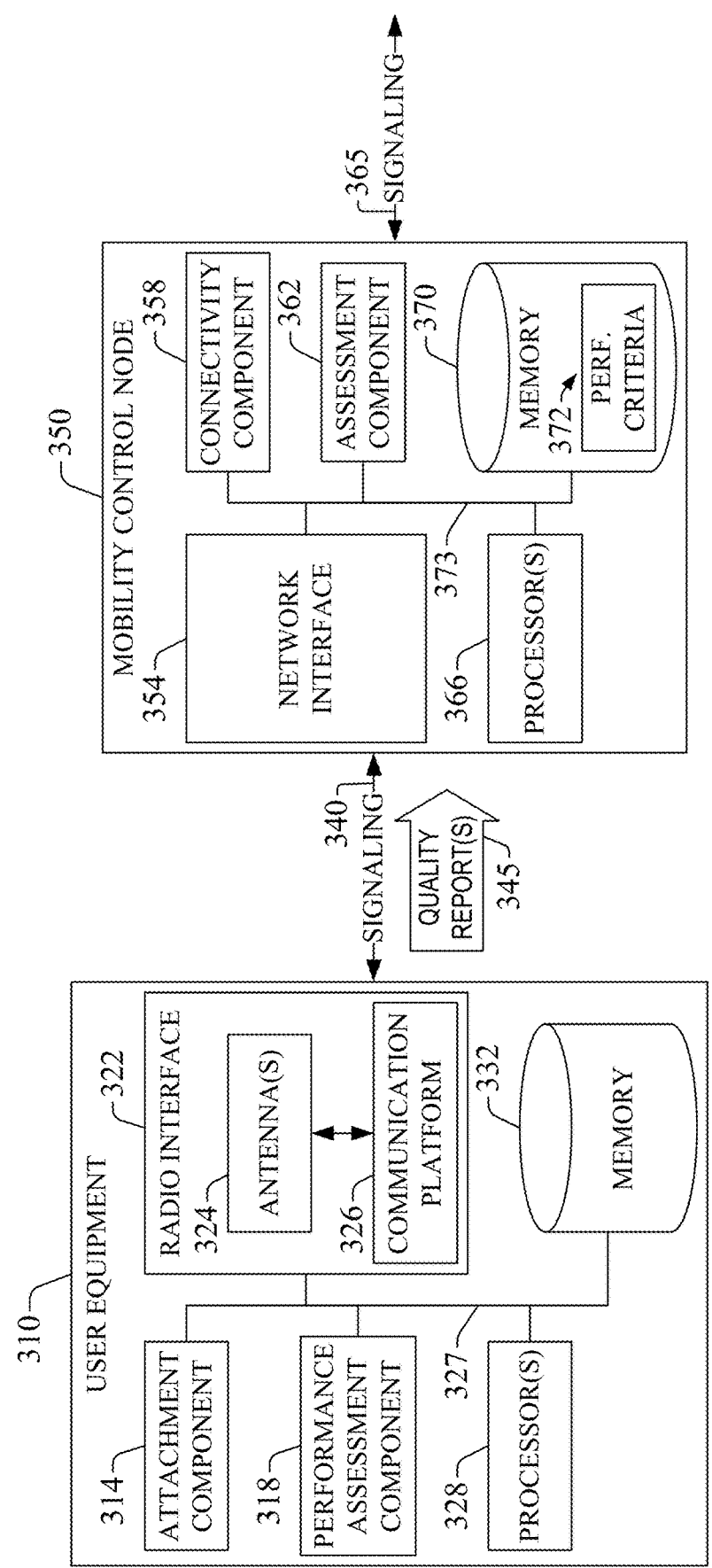
FIG. 3 illustrates an example system for wireless communication that enables and exploits performance diagnosis of wireless equipment through communication via out-of-band channel(s) in accordance with aspects described herein.

FIG. 3 is a block diagram of an example system 300 for wireless communication that enables and exploits performance diagnosis of wireless equipment through communication via out-of-band channel(s) in accordance with aspects described herein. The example system 300 includes a UE 310 and a mobility control node 350. UE 310 can embody any wireless equipment (UE, CPE, etc.) described herein, and MCN 350 can embody at least one MCN in the set of one or more MCN(s) 120. UE 310 includes an attachment component 314 that can register UE 310 to a set of wireless networks available for telecommunication. The set of wireless networks can include the wireless network comprising network platform I 110 and the wireless network comprising network platform II 160. Availability of a network for telecommunication can be dictated in part by reception (e.g. collection and decoding) at UE 310 of pilot signal(s) that convey at least one network identifier. It should be appreciated that UE 310 can establish availability a network for which the UE 310 can decode pilot signal(s) of the network. As an example, in embodiments in which UE 310 can operate in Wi-Fi mode in accordance with Wi-Fi radio protocol, and UMTS mode in accordance with 3GPP UMTS radio protocol, UE 310 can determine availability of a Wi-Fi network and a UMTS network. It should be appreciated that UMTS mode includes macrocell wireless coverage and femtocell wireless coverage. As another example, in embodiments in which UE 310 can operate in satellite-based mode and UMTS mode, UE 310 can establish availability of satellite-based networks and UMTS networks. In an aspect, UE 310, via attachment component 314, attempts registration with each network available for telecommunication. In another aspect, UE 310, via attachment component 314, attempts registration with a subset of one or more available networks, wherein the subset includes some or all available networks with radio link quality (e.g., SNR) above a predetermined threshold. Attachment component 314 can utilize a registration protocol based on the radio technology (GSM, 3GPP UMTS, 3GPP LTE, LTE Advance (LTE-A), satellite-based communication, etc.) of an available network in which UE 310 registers. In response to registration in the available network, data related to registration condition of the UE 310 is recorded in a repository (e.g., HLR, VLR, HSS . . . ) functionally coupled to or included in a network platform (e.g., a core network in 3GPP UMTS, 3GPP LTE, and LTE-A radio technologies) that is part of the available network. The data related to the registration condition can include a presence variable that adopts a value (numeric, alphanumeric, or logic) that indicates whether UE 310 is registered in the available network.

Signaling, and related payload data, associated with registration in an available network can be conveyed indirectly, via a functional element of a RAN or an AN, to at least one network component in a network platform included in the available network. UE 310 transmits and receives such signaling, and related payload data, via radio interface 322. Traffic directed to and originated in UE 310 can be received and transmitted by radio interface 322. In the illustrated embodiment in FIG. 3, radio interface 322 includes antenna(s) 324 and communication platform 326. Antenna(s) 324 can receive and transmit electromagnetic (EM) radiation with wavelengths in at least the radiofrequency or microwave portion of the EM spectrum; received EM radiation is conveyed to communication platform 326 for processing. Communication platform 326 comprises electronic components and associated circuitry that provides for processing and manipulation of received signal(s) and signal(s) to be transmitted, wherein such signal(s) are received or transmitted in suitable portions of the EM spectrum. The electronic components and circuitry can include a set of one or more chipsets that enable digital-to-analog/analog-to-digital conversion, multiplexing/demultiplexing signal(s), coding/decoding signal(s), and the like in accordance with a radio telecommunication protocol associated with a radio technology (3GPP LTE, 3GPP UMTS, LTE-A, Wi-Fi, satellite-based telecommunication, etc.). In one or more embodiments, communication platform 326 can include circuitry (e.g., one or more chipsets; not shown) and a processor (a processor that is part of processor(s) 328) to switch radio technology based at least on radio technology exploited by an intended recipient of a communication of a source of a communication. In an aspect, the communication platform 326 can switch radio technology within a configurable and upgradeable set of technologies in order to effect radio telecommunication. The set of radio technologies is associated in a one-to-one relationship or a one-to-many relationship with the set of wireless networks available for telecommunication.

As described supra, an MCN can receive a request to collect data indicative of performance condition of wireless equipment, wherein the performance condition can be represented by a value of a performance metric. The request can be delivered by a service platform (e.g., SA platform 150). In example system 300, mobility control node 350 can receive signaling 365, and related payload data, that conveys a request to collect data indicative of a performance condition of UE 310. In an aspect, connectivity component 358 can receive signaling 365 via network interface 354. In response to reception (e.g., collection and decoding) of such request, MCN 350 can deliver signaling 340 and related payload data to UE 310, wherein the signaling 340 includes one or more of a directive to generate a first performance metric or pilot signal(s) to produce a second performance metric. The first performance metric and the second performance metric represent performance condition of UE 310. In addition, the first performance metric can be determined without reliance on pilot signal(s); for instance, the first performance metric can be processor load or queued traffic, which can be evaluated without exchange (delivery and reception) of pilot signal(s). In certain scenarios, the first performance metric and the second performance metric are the same performance metric (e.g., a Cyclic Redundancy Check (CRC) value), which can be determined via the pilot signal(s) conveyed in signaling 340.

To deliver signaling 340 and related payload data to UE 310, MCN 350 establishes a communication channel (e.g., a control channel, a protocol-based tunnel channel, or the like) with UE 310. In the illustrated example embodiment, connectivity component 358 establishes the communication channel via, at least in part, network interface 354. At UE 310, attachment component 314 also enables, in part, establishment of the communication by exchanging signaling related to establishment of the communication channel with MCN 350. The communication channel is part and consumes resources of the wireless network that includes MCN 350; accordingly, the communication channel is referred to as an in-band communication channel, which allows in-band communication. The communication channel is established if operating conditions of the wireless network that includes MCN 350 affords establishing it. Upon or after the communication channel is established, assessment component 362 can monitor a connectivity condition of the communication channel. Available bandwidth, communication error statistics (block error rates, packet error rates, bit error rates, etc.), or the like, can characterize, at least in part, the connectivity condition of the communication channel. Factors that characterize the connectivity condition of the communication channel can be represented by a set of KPIs and, to monitor the connectivity condition, assessment component 358 can evaluate at least one KPI in the set. When at least one KPI is below a predetermined threshold, the communication channel can be deemed underperforming (or low-grade) and thus unavailable for communication.

UE 310 receives signaling 340 (e.g., control message(s), pilot signal(s) . . . ) and generates at least one value of a performance metric indicated by the signaling 340. In an aspect, performance assessment component 318 can generate a value of the performance metric. For a performance metric that is based on pilot signal(s), performance assessment component 318 can produce the pilot signal(s) (e.g., UL sounding reference signal in 3GPP LTE) and can convey the pilot signal(s) to radio interface 322 for delivery. Moreover, performance assessment component 318 can acquire (receive, retrieve, etc.) a response to the pilot signal(s) and generate the performance metric; the response to the pilot signal(s) can be received by radio interface 322, which can relay the response to performance assessment component 318. Alternatively or additionally, performance assessment component 318 can acquire the pilot signal(s) conveyed by signaling 340 and produce the performance metric associated with such pilot signal(s).

In response to generation of a value of a performance metric, UE 310 delivers the value via radio interface 322 as part of quality report(s) 345. The quality report(s) 345 can be conveyed within payload data within signaling 340. In the illustrated example embodiment, performance assessment component 318 can supply the value of the performance metric to radio interface 322 for delivery. Delivery of value(s) of a performance metric can be implemented in at least two modalities: (1) In-band. In a first example modality, quality report(s) 345 are delivered through the in-band communication channel that directly couples UE 310 and MCN 350. (2) Out-of-band. In a second example modality, quality report(s) 345 are delivered through a communication channel that is alternative to the in-band communication channel. The communication channel is referred to as out-of-band communication channel because it enables communication through resources of a wireless network in which UE 310 is registered and that is distinct from the wireless network comprising MCN 350. MCN 350 initiates the out-of-band modality when the in-band communication channel becomes unavailable. In an aspect, upon or after assessment component 362 determines the in-band communication channel is unavailable, assessment component 362 signal such unavailability to connectivity component 358 which, in response, delivers a directive to identify an alternative wireless network to the service platform (e.g., SA platform 150) that requested data indicative of performance condition of UE 310. The service platform (e.g., SA platform 150) receives (e.g., collects and decodes) the directive and, in response, identifies an alternative wireless network for delivery of quality report(s) 345; the alternative wireless network is the network that supports the out-of-band communication channel. The alternative wireless network receives a directive to establish a communication channel with UE 310 and, in response to the directive initiates a protocol-based tunnel that couples MCN 350 with UE 310 directly. The protocol-based tunnel is the out-of-band communication channel that enables delivery of quality report(s) 345 to MCN 350.

As indicated supra, MCN 350 can embody an RNC in 3GPP UMTS radio technology, wherein the first wireless network is a 3GPP UMTS network. In such embodiment, signaling 340 can be exchanged (transmitted and received) as part of Radio Resource Control (RRC) connection setup; connectivity component 358 enables at least part of the RRC connection setup. In addition, the performance metric that represents performance condition of UE 310 is CRC status, and the quality report(s) 345 include CRC error counts and are collected by MCN 350, embodied in an RNC, during at least a portion of the time interval of RRC connection setup. Moreover, signaling 340 and quality report(s) 345 are exchanged directly amongst UE 310 and Mobility Control Node 350 via the Dedicated Control Channel (DCCH), when the DCCH is available. In the alternative, when the DCCH is unavailable, attachment component 314 can establish a communication channel with MCN 350, embodied in an RNC, via at least one network functional element (component(s), server(s), link(s), etc.) of a second wireless network available to UE 310, as described supra, and performance assessment component 318 can deliver quality report(s) 345 over the communication channel. Such communication channel can be out-of-band with respect to a set of EM frequency carriers utilized by the 3GPP UMTS network. As described supra, the DCCH can be deemed unavailable when it exhibits underperforming communication condition(s) as disclosed by a set of KPIs and associated predetermined threshold(s); in certain embodiments, assessment component 362 can monitor availability of the DCCH.

UE 310 includes processor(s) 328 configured to enable or that enable, at least in part, functionality of substantially any or any component, interface, layer(s), or other functional element(s) within the UE 310. To provide at least such functionality, processor(s) 328 can execute computer-executable instructions (also referred to as computer-executable code instructions) retained in memory 332, wherein the computer-executable instructions can be retained, for example, in application storage (not shown) within memory 332. In particular, though not exclusively, to provide at least a part of the functionality of the various functional elements of UE 310, processor(s) 328 can implement (e.g., execute) one or more of the example methods described in the subject specification.

In UE 310, functional elements, e.g., components, interfaces, layer(s), can be mutually and functionally connected via bus 327. Such functional elements are also connected to memory 332 via bus 327. Processor(s) 328 also can be functionally connected to components, interfaces, layer(s), or substantially any or any functional elements that are part of UE 310. Bus 327 enables data or information exchange amongst the functional elements that it functionally connects. Such data or exchange of information allows, at least in part, numerous functional aspects of UE 310. In an aspect, bus 327 can be embodied in at least one of a memory bus, a system bus, an address bus, a message bus, or any other conduit, protocol, or mechanism for data or information exchange among components that execute a process or are part of execution of a process. In addition, bus 327 can include a power bus.

In particular, though not exclusively, processor(s) 328 is operationally coupled, through bus 327, to radio telecommunication interface 322 (also referred to herein and in annexed drawings as radio interface 322), and can enable at least part of one or more operations on data (e.g., packets, symbols, bits, or chips) that can enable telecommunication in accordance with a radio technology and associated protocol(s). Processor(s) 328 can afford at least part of multiplexing/demultiplexing operation(s), modulation/demodulation operation(s), coding/decoding operation(s), or the like. Such operations can include, for example, effecting direct and inverse fast Fourier transforms, selection of modulation rates, selection of data packet formats, inter-packet times, etc.

Moreover, processor(s) 328 is functionally connected, through bus 327, to memory 332 in order to store and retrieve information such as computer-executable instructions, data structures, etc., necessary to operate or provide functionality, at least in part, to communication platform 326, attachment component 314, performance assessment component 318, or other functional elements of UE 310. In addition to illustrated memory elements, memory 332 also can store, for example, data structures, code instructions and program modules, or substantially any type of software applications or at least part of firmware application (e.g., device logic); telecommunication protocol(s); operating system or device information; code sequence hypotheses, and modulation and multiplexing hypotheses; spreading and pilot codes; and so on. Furthermore, memory 332 also can retain content(s) (e.g., end-user or application data, data generated by other devices, or the like); security credentials (e.g., passwords, encryption keys, digital certificates, biometric reference indicators like voice recordings, iris patterns, fingerprints); or the like.

In one or more alternative or additional embodiment(s), processor(s) 328 can be distributed amongst one or more components of UE 310. In further one or more alternative or additional embodiments, one or more components of UE 310 can be implemented as software application(s) or firmware application(s) and can reside within memory 332 (or any computer-readable storage medium functionally coupled to UE 310) as one or more sets of computer-executable instructions that, when executed by processor(s) 328, implement the one or more components and functionality of UE 310 as described herein.

While not shown, UE 310 can include a power supply (e.g., a Li-based battery), which can be removable or fixed. The power supply (not shown) can be rechargeable and can be connected to auxiliary sources of power such as a photovoltaic panel. In addition, while not shown, UE 310 also can include a display and related display component(s) (pixel circuitry, lightning circuitry, computer-executable instructions, etc.) that enable rendering a message that conveys the performance fault(s), wherein the message can be received from an SA platform, as described supra. UE 310 can receive such message via radio interface 322, which relays the message to at least the display and related display component(s) (not shown).

Mobility control node 350 includes processor(s) 356 configured to provide or that provide, at least in part, functionality to substantially any or any component(s), interface(s), layer(s), or other functional element(s) within mobility control node 350. To provide at least such functionality, processor(s) 356 can execute computer-executable instructions (also referred to as computer-executable code instructions) retained in memory 360, wherein the computer-executable instructions can be retained, for example, in application storage (not shown) within memory 360. In particular, though not exclusively, to provide at least a part of the functionality of the various functional elements of mobility control node 350, processor(s) 256 can implement (e.g., execute) one or more of the example methods described in the subject specification.

Functional elements (e.g., components, interfaces, layer(s)) of mobility control node 350 can be mutually and functionally connected via bus 373. Such functional elements are also connected to memory 370 via bus 373. Processor(s) 366 also can be functionally connected to components, interfaces, layer(s), or substantially any or any functional elements that are part of mobility control node 350. Bus 373 enables data or information exchange amongst the functional elements that it functionally connects. Such data or exchange of information allows, at least in part, numerous functional aspects of mobility control node 350. In an aspect, bus 373 can be embodied in at least one of a memory bus, a system bus, an address bus, a message bus, or any other conduit, protocol, or mechanism for data or information exchange among components that execute a process or are part of execution of a process. In addition, bus 373 can include a power bus.

In particular, though not exclusively, processor(s) 356 is operationally coupled, through bus 363, to network interface 354 and can enable at least part of one or more operations on data (e.g., packets, symbols, bits, or chips) that can allow telecommunication in accordance with a radio technology and associated protocol(s).

Moreover, processor(s) 356 is functionally connected, through bus 363, to memory 360 in order to store and retrieve information such as computer-executable instructions, data structures, etc., necessary to operate or provide functionality, at least in part, to network interface 354, connectivity component 358, assessment component 362, or other functional elements of mobility control node 350. In addition to illustrated memory elements, memory 370 also can store, for example, data structures, computer-executable instructions and computer program modules, or substantially any type of software applications or at least part of firmware application (e.g., device logic); telecommunication protocol(s); operating system or device information; and so on. Moreover, memory 370 can include a set of performance (perf.) criteria 372 that enable, at least in part, connectivity component 358 to determine availability of a communication channel amongst mobility control node 350 and UE 310. The set of performance criteria 372 is related to a set of KPIs that can represent communication performance of the communication channel. Furthermore, in certain embodiments, memory 370 also can retain content(s) (e.g., end-user or application data, data generated by other devices, or the like); security credentials (e.g., passwords, encryption keys, digital certificates, biometric reference indicators like voice recordings, iris patterns, fingerprints); or the like.

In one or more alternative or additional embodiment(s), processor(s) 366 can be distributed amongst one or more components of mobility control node 350. In further one or more alternative or additional embodiments, one or more components of mobility control node 350 can be implemented as software application(s) or firmware application(s) and can reside (e.g., be stored) within memory 370 (or any computer-readable storage medium functionally coupled to mobility control node 350) as one or more sets of computer-executable instructions that, when executed by processor(s) 356, implement the one or more components and related functionality of mobility control node 350 as described herein.

Figure 4:
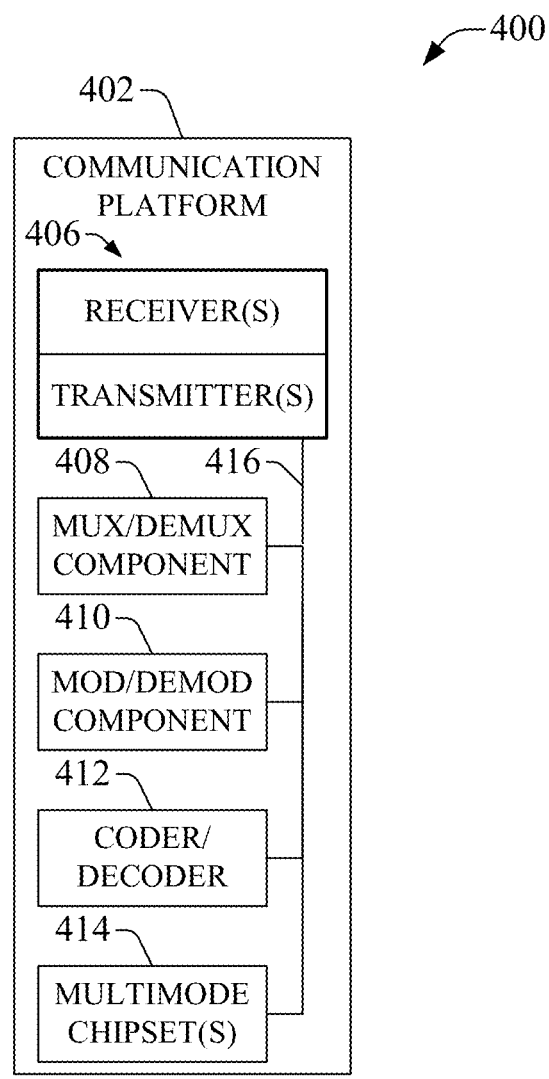
FIG. 4 presents an example embodiment of a communication platform that is part of a radio telecommunication interface within wireless equipment (UE, CPE, etc.) in accordance with aspects described herein.

FIG. 4 illustrates a block diagram of an example embodiment 400 of a communication platform that is part of a radio telecommunication interface within a UE (e.g., 310, 140) in accordance with aspects described herein. Communication platform 402 includes receiver(s)/transmitter(s) 406 that can convert signal(s) from analog to digital upon reception, and from digital to analog upon transmission. Signals that are received or converted to be transmitted have wavelengths in the radiofrequency or microwave portion of the EM spectrum. In addition, based upon antenna structure (e.g., antenna(s) 324; not shown in FIG. 3) and radio telecommunication protocol, receiver(s)/transmitter(s) 406 can divide a single data stream into multiple, parallel data streams, or perform the reciprocal operation. For communication platform 402, signals that are received or converted to be transmitted have wavelengths in the visible to microwave portion of the EM spectrum. Wavelengths of EM radiation manipulated (e.g., received, transmitted, or processed) by communication platform 402 can be determined at least in part by a network administrator that deploys a wireless network.

In communication platform 402, coupled to receiver(s)/transmitter(s) 406 is a multiplexer/demultiplexer component 408 that enables manipulation in time and frequency domain of received signal(s) or signal(s) to be transmitted via the radio telecommunication interface, such as radio interface 322 (not shown in FIG. 4). Electronic mux/demux component 408 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, based on telecommunication protocol employed for radio telecommunication, mux/demux component 408 can scramble and spread information (e.g., codes) according to substantially any code known in the art; e.g., Hadamard-Walsh codes, Baker codes, Kasami codes, polyphase codes, and so on. A modulator/demodulator (mod/demod) component 410 is also a part of communication platform 402, and can modulate information according to multiple modulation techniques, such as frequency modulation, amplitude modulation (e.g., M-ary quadrature amplitude modulation (QAM), with M a positive integer), phase-shift keying (PSK), and the like. Mod/demod component 410 also can demodulate information processed in accordance with the foregoing modulation techniques.

Coder/decoder component 412 can process signal(s) that are received or that are to be transmitted in accordance with a radio telecommunication protocol. In an aspect, decoding can be based at least in part on blind decoding of received signal(s), computation of log-likelihood ratios (LLR) associated with constellation realization for a specific demodulation; maximum likelihood (ML) estimation, minimum mean square equalization (MMSE), zero forcing (ZF) filtering, or maximal ratio combining (MRC) filtering. Multi-mode chipset(s) 414 enable communication platform 402, and component(s) or functional elements therein, to operate in one or more radio technologies.

Functional elements, e.g., component(s), coder/decoder, receiver(s)/transmitter(s), are functionally connected via bus 416. Bus 416 enables exchange of data, signaling, or any other information, amongst the functional elements connected through such bus. In an aspect, bus 416 can be embodied in at least one of a memory bus, a system bus, an address bus, a message bus, or any other conduit, protocol, or mechanism for data or information exchange among components that execute a process or are part of execution of a process. In addition, bus 416 can include a power bus.

Figure 5:
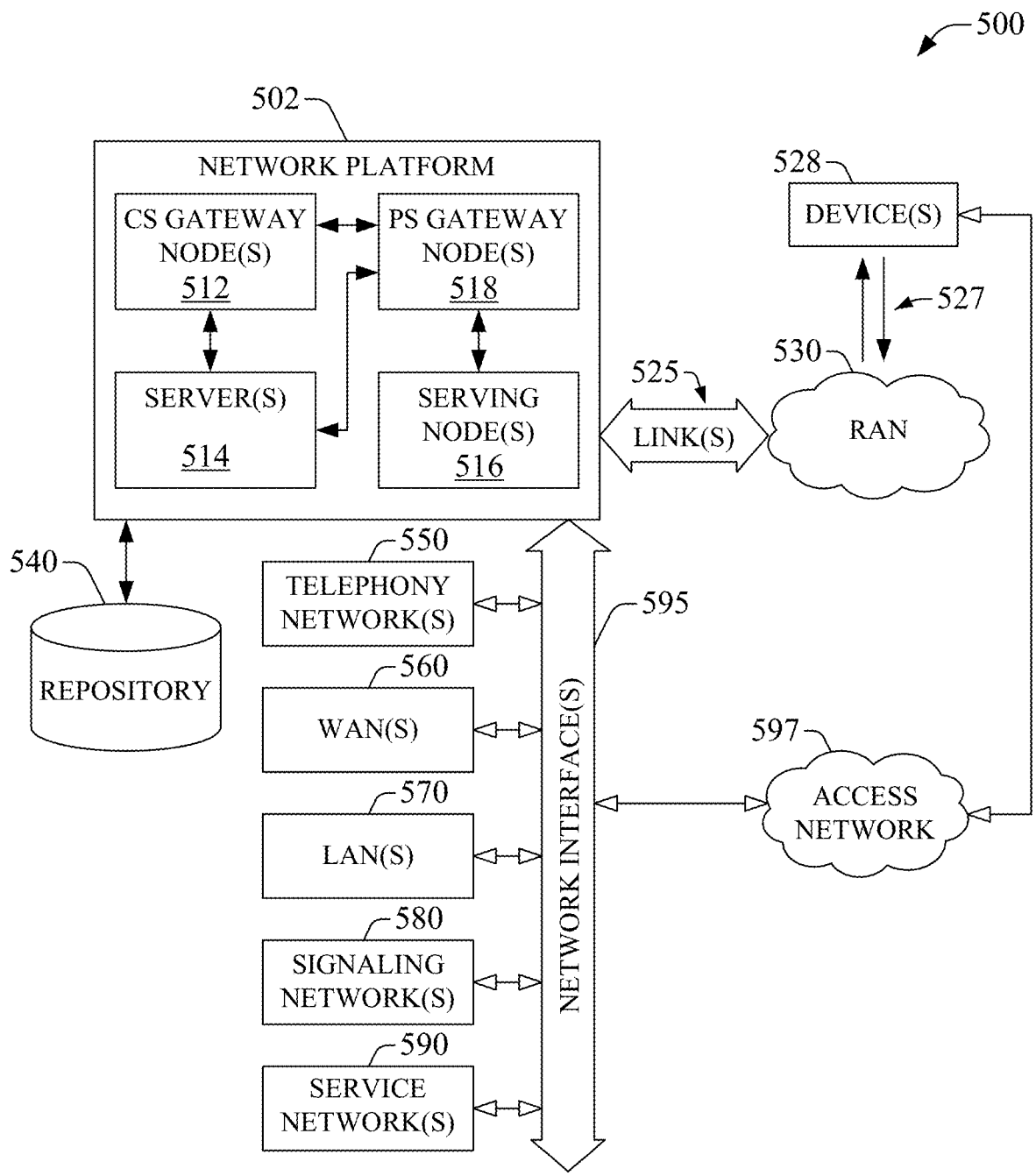
FIG. 5 presents a high-level block diagram of an example network environment that enables implementation and exploitation of various aspects described in the subject disclosure.

FIG. 5 presents a high-level block diagram of an example network environment 500 that can enable implementation and exploitation of various aspects described in the subject disclosure. In example wireless environment 500, network platform 502, can embody network platform I 110 or network platform II 160, or substantially any network platform described herein; component(s), interface(s), and other functional element(s) of network platform 502 can be logically specific to a radio technology. Network platform 502 can include one or more functional elements, e.g., component(s), node(s), gateway node(s), interface(s), server(s), or platform(s) that enable both packet-switched (PS) (e.g., internet protocol (IP), frame relay, asynchronous transfer mode (ATM)) and circuit-switched (CS) traffic (e.g., voice and data) and control generation for networked communication, wireless or otherwise. It should be appreciated that in cellular wireless technologies (e.g., 3GPP UMTS, HSPA, 3GPP LTE, 3GPP UMTS, 3GPP2 UMB), network platform 502 embodies a core network. PS gateway node(s) 518 can embody at least part the PS domain. Functional element within the PS domain can enable exchange of notifications, indications, and directives in accordance with various networked communication protocols indicated herein, including one or more peer-to-peer transport protocol(s). With respect to CS communication, network platform 502 includes CS gateway node(s) 512, which can interface CS traffic received from legacy networks like telephony network(s) 550 (e.g., public switched telephone network (PSTN), or public land mobile network (PLMN)) or a signaling network(s) 580 (e.g., a SS7 network). CS gateway node(s) 512 also can enable exchange of messaging communications in SMS protocol. In addition, CS gateway node(s) 512 can authorize and authenticate traffic (e.g., voice) arising from such networks. Moreover, CS gateway node(s) 512 can access mobility, or roaming, data generated through signaling network(s) 580 in response to various mobility events as described herein; for instance, the mobility data can be stored in a VLR, which can reside in repository 540. Furthermore, CS gateway node(s) 512 can interface CS-based traffic or signaling with PS gateway node(s) 518. As an example, in a 3GPP UMTS network, CS gateway node(s) 512 can be embodied, at least in part, in gateway GPRS support node(s) (GGSN).

In the subject disclosure, in addition to receiving and processing CS-based traffic and signaling data, PS gateway node(s) 518 can authorize and authenticate PS-based data sessions with device(s) 528 served through RAN 530 via link(s) 525 and link(s) 527, both of which can include wireline links (e.g., reference links) or wireless link(s) (e.g., line-of-sight (LOS) links, deep-space links . . . ). Device(s) 528 is a set of devices that includes wireless device(s), wireline device(s), or a combination thereof. For example, device(s) 528 can include a mobile device of a subscriber that exploits customized communication routing as described herein, and a set of wireline devices that operate within service coverage area served by a base station that can operate in accordance with one or more radio technologies.

Radio access network (RAN) 530 can include one or more components that enable transmission of data and signaling, including related payload data, amongst device(s) 528 and network platform 502. RAN 530 can include a radio access network (RAN), and associated component(s). For wireline devices, one or more components that are part of a wireline network, e.g., included in service network(s) 590, enable the transmission of data and signaling. Link(s), represented with open arrows, operationally connected to network interface(s) 595 can deliver data and signaling to the wireline device via the one or more components of the wireline network, for example represented by access network 597, and related link(s) represented with open arrows connecting the access network 597 to device(s) 528. Data sessions (e.g., voice calls, data calls . . . ) can include traffic exchange with networks external to network platform 502, such as wide area network(s) (WAN(s)) 560 or service network(s) 590; local area network(s) (LAN(s)) 570 (e.g., enhanced 911) also can be interfaced with network platform 502 through PS gateway node(s) 518. In an aspect, WAN(s) 560 can include a wireless WAN, which can embody a network platform disparate from network platform 502, wherein the network platform disparate from network platform 502 can have substantially the same functional elements as network platform 502. Network interface(s) 595 enable the traffic exchange; such interface(s) can include conventional wireline or wireless links, or reference links specific to each of the external network(s) that interface with PS gateway node(s) 518, or other portions of the PS domain in network platform 502. In an aspect, PS gateway node(s) 518 can generate packet data protocol (PDP) contexts when a data session is established. To at least that end, in an aspect, PS gateway node(s) 518 can include a tunnel interface (e.g., tunnel termination gateway (TTG) in 3GPP UMTS network(s) (not shown)) which can facilitate packetized communication with disparate wireless network(s), which can be part of access network(s) 520 and can include Wi-Fi networks, femtocell network(s), macrocell network(s) and associated radio access network(s) (RAN(s)) based on various radio technology generations, etc. It should be further appreciated that packetized communication can include multiple flows of data that can be generated through server(s) 514, such as management server(s) (e.g., a provisioning server, a Mobile Switching Center (MSC)) or application server(s). It is to be noted that in 3GPP UMTS network(s), PS gateway node(s) 518 (e.g., GGSN) and tunnel interface (e.g., TTG) comprise a packet data gateway (PDG).

In network environment 500, network platform 502 also includes serving node(s) 516 that conveys the various packetized flows of data streams that can be directed to device(s) 528, and that are received through PS gateway node(s) 518 from server(s) 514. In turn, server(s) 514 can receive the communication(s), such as request for data intended to service network(s) 590, which can include an IMS core or other packet-based cores, from user equipment within device(s) 528 or network elements. In certain embodiments, service network(s) 590 can include service assurance platform 150. As an example, in a 3GPP UMTS network, serving node(s) 516 can be embodied in serving GPRS support node(s) (SGSN). As another example, in a 3GPP LTE network, service node(s) 516 can be embodied in one or more Mobility Management Entities (MMEs).

Server(s) 514 can operate in various layers of network platform 502. For example, server(s) 514 can operate as part of Operations Support Systems (OSS), Business Support Systems (BSS), or network subsystems such as IMS core network. Server(s) 514 can execute numerous applications, which can include consumer-oriented application(s), such as messaging services, location services, online gaming, wireless banking, or system-oriented applications, e.g., wireless device management, scheduling or queuing of network traffic, or the like. Such application(s), either consumer-oriented or system-oriented, can generate sets of packetized data streams or flows, and manage (e.g., schedule, queue, format . . . ) such flows. In an aspect, a server within server(s) 514 can be a Domain Name Server (DNS) that executes one or more service-oriented applications that can supply a logical address (e.g., an IP address) of a serving node within serving node(s) 516. The logical address of the serving node can be supplied in response to a request (e.g., a query) from a disparate serving node within serving node(s) 516 or serving node(s) that are part of a disparate network platform. Application(s) executed by server(s) 514 can include, for example, add-on features to standard services provided by network platform 502. Data streams generated by server(s) 514 can be conveyed to PS gateway node(s) 518 for authentication/authorization and initiation of a data session or for execution, at least in part, of a telecommunication procedure (Tracking Area Update procedure, Location Area Update procedure, Routing Area Update procedure, Attach procedure, etc.) for communication to device(s) 528 thereafter.

Server(s) 514 also can effect security (e.g., implement one or more firewalls) of network platform 502 to ensure network's operation and data integrity in addition to authentication and authorization procedures that CS gateway node(s) 512 and PS gateway node(s) 518 can enact. In addition, server(s) 514 can implement timing protocols (e.g., Network Time Protocol (NTP)) that supply timing framework(s) for various operation(s) of network platform 502. Moreover, server(s) 514 can provision services from external network(s), e.g., WAN(s) 560, LAN(s) 570, IMS core network, which can be part of service network(s) 590, or Global Positioning System (GPS) network(s) (not shown). Server(s) 514 can include one or more processors (not shown) configured to provide or that provide, in part, the functionality of network platform 502. To that end, the one or more processors (not shown) can execute one or more sets of computer-executable instructions (not shown) stored in repository 540, for example.

In example network environment 500, repository 540 can store information related to operation of network platform 502. Information can include content(s), such as subscriber-generated content or from various other sources; subscriber account(s) and associated credential(s); pricing schemes, e.g., promotional rates, flat-rate programs, couponing campaigns; and so forth. In addition, repository 540 can store information from at least one of telephony network(s) 550, WAN(s) 560, LAN(s) 570, signaling network(s) 580, or service network(s) 590. While illustrated as a single entity, repository 540 can be distributed amongst one or more of the described external networks, server(s) 514, or other functional elements of network platform 502. Memory 540 can be embodied at least in part in a VLR, a HSS, or storage available within a consolidated data repository that centralizes data (administrative data, operational data, etc.) for at least network platform 502.

Figure 6:
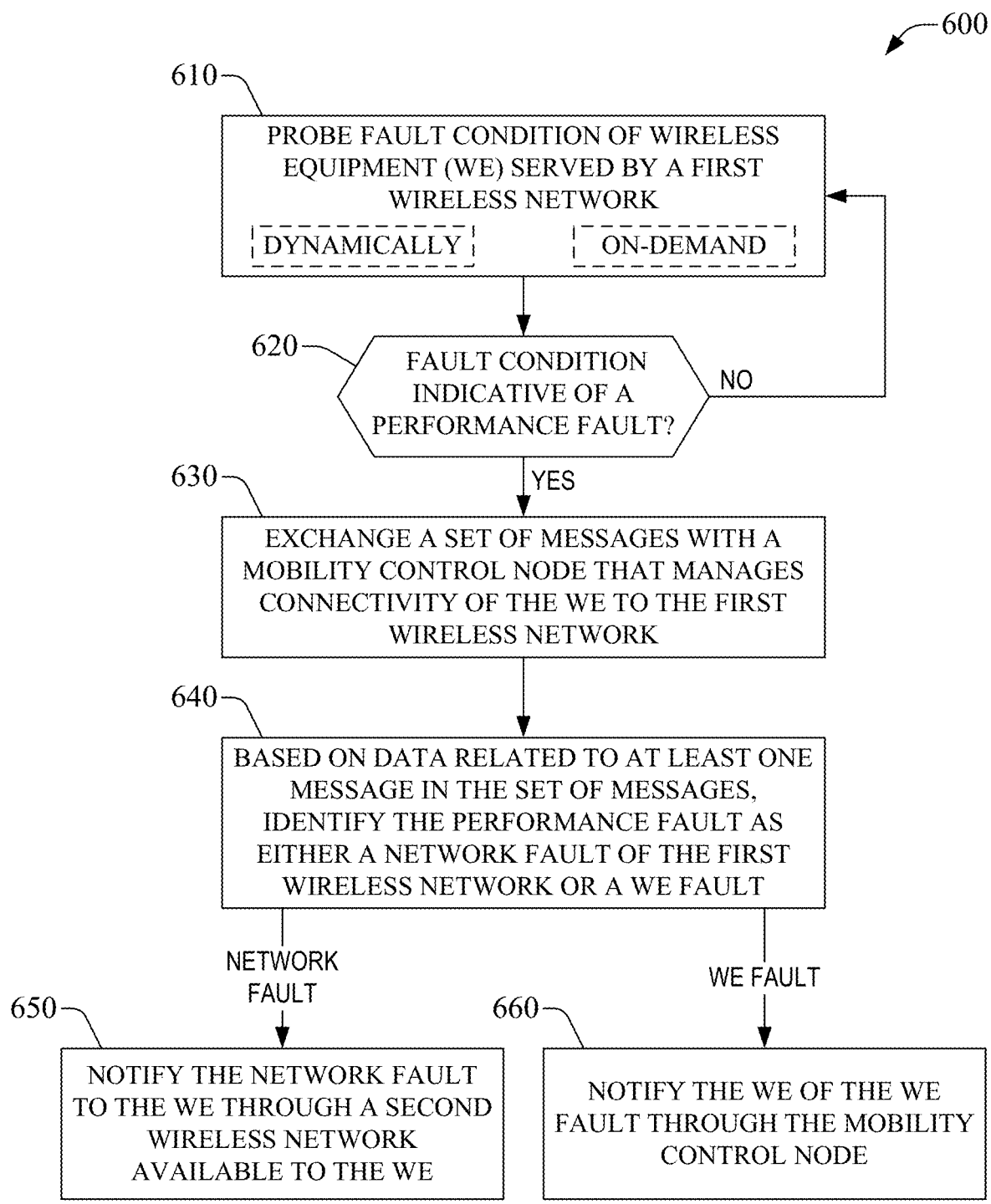
FIGS. 6-7 present example methods for diagnosing performance of wireless equipment (UE, CPE, etc.) according to aspects described herein.
Figure 7:
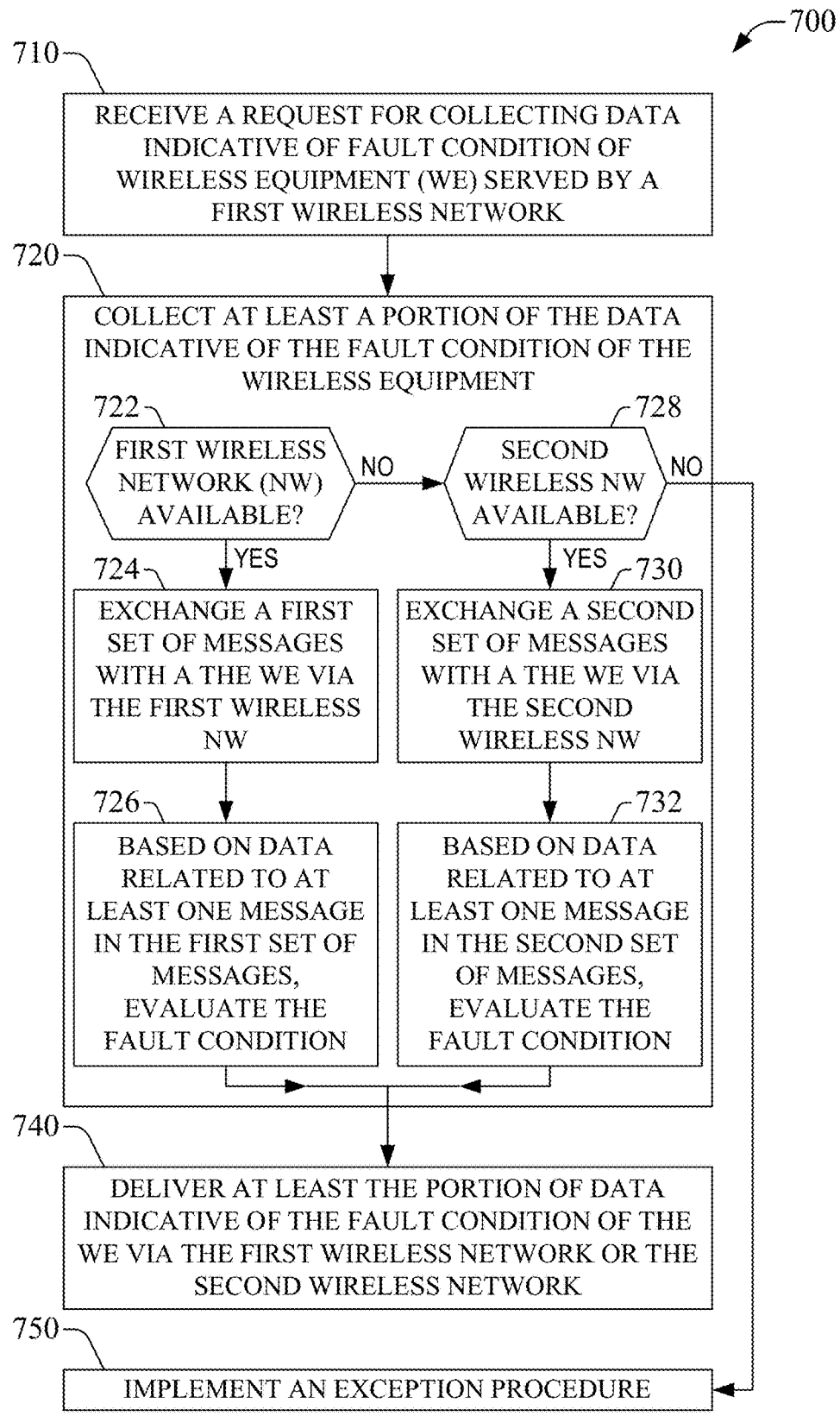

In view of the example system(s), apparatus(es), and device(s) described supra, example method(s) that can be implemented in accordance with the disclosed subject matter can be better appreciated with reference to flowcharts in FIGS. 6-7. For purposes of simplicity of explanation, the example method(s) disclosed herein are presented and described as a series of acts. However, it is to be understood and appreciated that the disclosed subject matter is not limited by the order of acts, as some acts may occur in different orders or concurrently with other acts from that shown and described herein. For example, one or more methods disclosed herein could alternatively be represented as a series of interrelated states or events, such as in a state diagram. Moreover, interaction diagram(s) or call flow(s) may represent one or more methods described herein when disparate entities, or functional elements, enact disparate portions of the one or more methods. Furthermore, not all illustrated acts may be required to implement a described method in accordance with the subject specification. Further yet, two or more of the disclosed methods can be implemented in combination, to accomplish one or more features or advantages described herein.

Methods disclosed throughout the subject specification and annexed drawings are capable of being stored on an article of manufacture to facilitate transporting and transferring such methods to computers for execution, and thus implementation, by a processor or for storage in a memory. In an aspect, one or more processors, such as processor(s) that enact the method(s) described herein, can be employed to execute computer-executable instructions stored in a memory, or any computer-readable or machine-readable storage medium, to implement method(s) described herein—the computer-executable instructions provide a computer-executable or machine-executable framework for a computing device to perform the method(s) described herein.

FIGS. 6-7 represent flowcharts of example methods for diagnosing performance of wireless equipment (UE, CPE, etc.) according to aspects described herein. With respect to example method 600, a network node (e.g., SA platform 150) or functional element(s) therein can implement (e.g., execute) the subject example method. One or more processors also can perform the subject example method. In an aspect, the one or more processors can be configured to enable or can enable, at least in part, the functionality of the network node or the functional element(s) therein. In another aspect, the one or more processors can execute one or more functional elements (component(s), server(s), etc.) within the network node to perform at least one act of the subject example method when such one or more functional elements are embodied in a set of computer-executable instructions that are part of a software application or a firmware application. The software application or the firmware application can be retained within the network node or other network functional elements.

At act 610, fault condition of wireless equipment is probed, wherein the wireless equipment is served by a first wireless network. The probing can include delivering a request to collect data related to operation condition(s) of the wireless equipment; the operation condition can be characterized by various KPIs including a channel quality indicator (CQI), signal-to-noise ratio (SNR), signal-to-noise-and-interference ratio (SNIR), processing load, queued traffic, or the like. The probing can be implemented on-demand or dynamically. As described supra, on-demand implementation can include delivering the request to collect data related to operation condition(s) of the WE in response to a request from a network functional element (component(s), network node(s), server(s), etc.) related to providing wireless service to the WE or to administering (e.g., provisioning, activating, troubleshooting, etc.) the WE. In the alternative, also as described hereinbefore, dynamic implementation include delivering the request to collect data related to operation condition(s) of the WE based on event(s), wherein the probing is performed in response to occurrence of a predetermined event.

At act 620, it is determined if the fault condition obtained through the probing at act 610 is indicative of a performance fault. In the negative case, flow is directed to act 610, at which further probing is implemented. In the affirmative case, flow is directed to act 630, at which a set of messages are exchanged with a mobility control node (e.g., an RNC in 3GPP UMTS radio technology or an MME in 3GPP LTE), wherein the mobility control node manages connectivity of the WE to the first wireless network. The set of messages is exchanged to collect data that enable, at least in part, diagnosing the performance fault. At act 640, based on the data related to at least one message in the set of messages, the performance fault is identified as either a network fault (or network-based fault) of the first wireless network or a wireless equipment fault (or a WE-based fault). In an example scenario, acts 630 and 640 collectively can embody the act of determining the performance fault to be a network-based fault or a WE-based fault in response to the fault condition being indicative of the performance fault.

In case of a network fault, at act 650, the WE is notified of the network fault through a second wireless network (e.g., a femtocell network, a satellite-based network, or a Wi-Fi network). Notifying the WE can include delivering a short message service (SMS) message, a MME message, an email message, a USSD message, or the like. Alternatively, in case of WE fault, at act 660, the wireless equipment (WE) is notified of the WE fault through the mobility control node. In an aspect, notifying the WE includes queuing a message (SMS message, MME message, email message, etc.) until the WE has recovered from fault condition, and then delivering the message through the MCN.

In connection with example method 700, a mobility control node (e.g., an MCN in the set of MCNs 120) or functional element(s) therein can implement (e.g., execute) the subject example method. The MCN that implements the subject example method can be the MCN indicated in example method 600. One or more processors also can perform the subject example method. In an aspect, the one or more processors can be configured to enable or can enable, at least in part, the functionality of the mobility control node (e.g., an RNC in 3GPP UMTS or MME in 3GPP LTE or Evolved Packet Core (EPC) network) or the functional element(s) therein. In another aspect, the one or more processors can execute one or more functional elements (component(s), server(s), etc.) within the network node to perform at least one act of the subject example method when such one or more functional elements are embodied in a set of computer-executable instructions that are part of a software application or a firmware application. The software application or the firmware application can be retained within the MCN or other network functional elements.

At act 710, a request for collecting data indicative of fault condition of wireless equipment is received, wherein a first wireless network serves the WE. In an aspect, the request can be received from a service platform (e.g., SA platform 150) or network node. At act 720, at least a portion of the data indicative of the fault condition of WE is collected. In an aspect, as illustrated, collecting at least the portion of such data includes various acts.

At act 722, it is determined if the first wireless network is available for telecommunication. In an aspect, determining availability of the first wireless network includes monitoring connectivity condition of a communication channel the couples the WE and a network node that manages mobility of the WE within the first wireless network. The monitoring includes evaluating at least one KPI representative of the connectivity condition and comparing a value of the at least one KPI with a set of thresholds retained within a group of performance criteria (see, e.g., FIG. 3). In certain scenarios, the set of thresholds can include at least one threshold to determine fault condition and a second threshold to determine "at risk" of fault condition. In the affirmative case (e.g., when evaluated KPI indicates normal connectivity condition), at act 724, a first set of messages (e.g., downlink pilot messages and related response(s)) is exchanged with the WE via the first network. In certain embodiments, the first network is a 3GPP UMTS network. At act 726, based on data related to at least one message (e.g., a response to a specific DL pilot message) in the set of messages, the fault condition is evaluated.

A negative outcome of act 722 (e.g., when a KPI indicates fault connectivity condition or "at risk" connectivity condition) directs flow to act 728, at which it is determined is a second network is available for telecommunication. In certain embodiments, the second network is one of a 3GPP LTE network, a femtocell network, a Wi-Fi network, a satellite-based network, and so forth. In an aspect, determining availability of the second wireless network comprises extracting registration state of the WE with at least one wireless network in a set of wireless networks alternative to the first wireless network; the registration state can be extracted from a network platform that is part of the at least one wireless network. A negative outcome to act 728 leads to act 750, at which an exception procedure is implemented. The exception procedure can be directed, at least in part, to supplying information related to unavailability of access, via telecommunication, with the wireless equipment. In an aspect, as part of implementing the exception procedure, a message that conveys telecommunication unavailability can be delivered to the source (e.g., network node such as SA platform 150) of the request for collecting data indicative of the fault condition of wireless equipment. In the alternative, an affirmative outcome of act 728 leads to act 730, at which a second set of messages is exchanged with the wireless equipment via the second network. At act 732, based on data related to at least one message in the second set of messages, the fault condition is evaluated.

At act 740, at least the portion of data indicative of the fault condition of the WE is delivered via the first wireless network or the second wireless network.

Various advantages emerge from features or aspects of the one or more embodiments disclosed herein. An example advantage is that utilization of an out-of-band communication channel renders network performance diagnosis resilient or substantially resilient with respect to performance issues. Another example advantage is low-complexity: In certain embodiments, performance condition of wireless equipment can be assessed through collection of CRC error counts, which in 3GPP UMTS networks is performed as part of RRC connection setup. Accordingly, by leveraging network deployments alternative to 3GPP UMTS networks, a network operator can exploit data related to CRC error counts to readily implement network performance diagnosis without extensive modification to network architecture.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "data store," "data storage," "database," "repository," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various aspects or features described herein may be implemented as a method, apparatus, or article of manufacture using standard programming and/or engineering techniques. In addition, various aspects disclosed in the subject specification can also be implemented through program modules stored in a memory and executed by a processor, or other combination of hardware and software, or hardware and firmware. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disc (CD), digital versatile disc (DVD), blu-ray disc (BD) . . . ), smart cards, and flash memory devices (e.g., card, stick, key drive . . . ).

Additionally, various features of the subject disclosure can be implemented in a computing device (a UE, a serving node, a server, etc.). Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What has been described above includes examples of systems and methods that provide advantages of the subject disclosure. It is, of course, not possible to describe every conceivable combination of components or methodologies for purposes of describing the subject disclosure, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
   facilitating a transmission of performance fault data associated with a user equipment to a first network device of a first network, wherein the facilitating the transmission is in response to receipt of a request to collect data related to operation of the user equipment, and wherein the request is received in response to detection of a defined event;
   receiving, from the first network device performance fault data determined based on performance metric data, wherein the performance fault data is received via an in-band communication channel in response to the performance fault data having been determined to represent a performance fault associated with the user equipment and after a group of messages are exchanged with a mobility control node device that manages connectivity of the user equipment to the first network, wherein the group of messages are further exchanged to collect signaling data to enable diagnosing of the performance fault, and wherein the signaling data associated with the group of messages indicates that the performance fault is a type of fault from a group of types, the group of types comprising a network-based fault and a user equipment fault; and
   receiving, from a second network device of a second network, the performance fault data via a second communication channel distinct from the in-band communication channel, wherein the second communication channel couples the user equipment and the second network device, and wherein the receiving the performance fault data via the second communication channel is performed based on a determination that the type of fault of the performance fault is not indicative of the user equipment fault and is indicative of the network-based fault.

2. The system of claim 1, wherein the in-band communication channel comprises the mobility control node device and the user equipment as endpoints of the in-band communication channel, and wherein the operations further comprise:
   receiving the signaling data from the mobility control node device.

3. The system of claim 2, wherein the signaling data comprises directive data indicative of a directive to determine load data associated with the processor.

4. The system of claim 2, wherein the signaling data comprises directive data indicative of a directive to determine traffic data.

5. The system of claim 2, wherein the signaling data comprises pilot signal data that is utilized to determine the performance metric data.

6. The system of claim 5, wherein the performance metric data comprises a cyclic redundancy check value.

7. The system of claim 2, wherein the receiving the signaling data comprises receiving the signaling data during an establishment of a radio resource connection between the mobility control node device and the user equipment.

8. The system of claim 1, wherein the second network device is the mobility control node device, and wherein the facilitating comprises facilitating the transmission via the mobility control node device.

9. The system of claim 1, wherein the operations further comprise:
   facilitating a presentation of the network fault data via the user equipment.

10. A method, comprising:
    transmitting, by a user equipment comprising a processor, performance fault data associated with the user equipment, wherein the transmitting is in response to receipt of a request to collect data related to operation of the user equipment, and wherein the request is received in response to detection of administrative operations being performed at the user equipment;
    receiving, by the user equipment, based on the performance metric data, performance fault data from a first network device of a first network, wherein the performance fault data is received via an in-band communication channel in response to the performance fault data having been determined to represent a performance fault associated with the user equipment and after a group of messages are exchanged with a mobility control node device that manages connectivity of the user equipment to the first network, wherein the group of messages are also exchanged to collect signaling data to enable diagnosing the performance fault, and wherein the signaling data associated with the group of messages indicates that the performance fault is one from a group of faults, the group of faults comprising a network-based fault and a user equipment fault; and
    receiving, by the user equipment based on the performance metric data, performance fault data from a second network device of a second network, wherein the performance fault data is received via an out-of-band communication channel of the second network in response to a determination that the performance fault is not indicative of the user equipment fault and is indicative of the network-based fault.

11. The method of claim 10, further comprising:
    rendering, by the user equipment, the performance fault data.

12. The method of claim 10, further comprising:
    receiving, by the user equipment, request data from a radio network controller device, wherein the request data is indicative of a request to determine the performance metric data.

13. The method of claim 12, wherein the receiving the request data comprises receiving a radio resource connection setup message.

14. The method of claim 12, further comprising:
    determining, by the user equipment, the performance metric data based on an analysis of pilot signal data.

15. The method of claim 14, wherein the pilot signal data is associated with a pilot signal received from the radio network controller device.

16. The method of claim 11, wherein the performance metric data comprises information indicative of a cyclic redundancy check value.

17. A non-transitory machine-readable storage medium, comprising executable instructions that, when executed by a processor, facilitate performance of operations, comprising:

facilitating a transmission of performance fault data associated with a user equipment to a first network device of a first network, wherein the facilitating the transmission is in response to receipt of a request to collect data related to operation of the user equipment, and wherein the request is received in response to detection of a defined event;

receiving, from the first network device performance fault data determined based on performance metric data, wherein the performance fault data is received via an in-band communication channel in response to the performance fault data having been determined to represent a performance fault associated with the user equipment and after a group of messages are exchanged with a mobility control node device that manages connectivity of the user equipment to the first network, wherein the group of messages are further exchanged to collect signaling data to enable diagnosing of the performance fault, and wherein the signaling data associated with the group of messages indicates that the performance fault is a type of fault from a group of types, the group of types comprising a network-based fault and a user equipment fault; and receiving, from a second network device of a second network, the performance fault data via a second communication channel distinct from the in-band communication channel, wherein the second communication channel couples the user equipment and the second network device, and wherein the receiving the performance fault data via the second communication channel is performed based on a determination that the type of fault of the performance fault is not indicative of the user equipment fault and is indicative of the network-based fault.

18. The non-transitory machine-readable storage medium of claim 17, wherein the in-band communication channel comprises the mobility control node device and the user equipment as endpoints of the in-band communication channel, and wherein the operations further comprise:

receiving the signaling data from the mobility control node device.

19. The non-transitory machine-readable storage medium of claim 18, wherein the signaling data comprises directive data indicative of a directive to determine load data associated with the processor.

20. The non-transitory machine-readable storage medium of claim 18, wherein the signaling data comprises directive data indicative of a directive to determine traffic data.

* * * * *